US009761712B1

(12) United States Patent
Anderson et al.

(10) Patent No.: US 9,761,712 B1
(45) Date of Patent: Sep. 12, 2017

(54) VERTICAL TRANSISTORS WITH MERGED ACTIVE AREA REGIONS

(71) Applicant: INTERNATIONAL BUSINESS MACHINES CORPORATION, Armonk, NY (US)

(72) Inventors: Brent A. Anderson, Essex Junction, VT (US); Albert M. Chu, Nashua, NH (US); Terence B. Hook, Essex Junction, VT (US); Seong-Dong Kim, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/338,867

(22) Filed: Oct. 31, 2016

(51) Int. Cl.
| G06F 17/50 | (2006.01) |
| H01L 29/78 | (2006.01) |
| H01L 29/08 | (2006.01) |
| H01L 29/06 | (2006.01) |
| H01L 27/088 | (2006.01) |
| H01L 23/528 | (2006.01) |
| H01L 27/02 | (2006.01) |

(52) U.S. Cl.
CPC ...... *H01L 29/7827* (2013.01); *G06F 17/5072* (2013.01); *G06F 17/5077* (2013.01); *H01L 23/5286* (2013.01); *H01L 27/0207* (2013.01); *H01L 27/088* (2013.01); *H01L 29/0649* (2013.01); *H01L 29/0847* (2013.01)

(58) Field of Classification Search
CPC ...................................................... G06F 17/50
USPC ...................................................... 716/119
See application file for complete search history.

(56) References Cited

U.S. PATENT DOCUMENTS

| 5,572,048 | A | 11/1996 | Sugawara |
| 7,579,240 | B2 | 8/2009 | Forbes |
| 7,851,865 | B2 | 12/2010 | Anderson et al. |
| 8,896,063 | B2 | 11/2014 | Adam et al. |
| 9,276,108 | B2 | 3/2016 | Liaw |
| 2006/0267090 | A1* | 11/2006 | Sapp .................. H01L 29/7827 257/341 |
| 2014/0231916 | A1* | 8/2014 | Giraud ............. H01L 29/42392 257/347 |
| 2016/0163811 | A1 | 6/2016 | Anderson et al. |

* cited by examiner

*Primary Examiner* — Thuan Do
(74) *Attorney, Agent, or Firm* — Tutunjian & Bitetto, P.C.; Vazken Alexanian (57) ABSTRACT

A method for device layout with vertical transistors includes identifying active area regions in a layout of a semiconductor device with vertical transistors. Sets of adjacent active area regions having a same electrical potential are determined. The sets of adjacent active area regions to be merged are prioritized based upon one or more performance criterion. The sets of adjacent active area regions are merged to form larger active area regions according to a priority.

23 Claims, 7 Drawing Sheets

VERTICAL TRANSISTORS WITH MERGED ACTIVE AREA REGIONS

BACKGROUND

Technical Field

The present invention generally relates to semiconductor layouts, and more particularly to devices and methods for laying out vertical transistor designs with merged active areas (e.g., bottom source and drain regions) to reduce resistance and improve layout area.

Description of the Related Art

Vertical field-effect transistors (VFETs) include a channel perpendicular to a surface of a substrate on which the VFET is formed, as opposed to being situated along a plane of the surface of the substrate. This increases the packing density of these devices and improves a scaling limit beyond planar finFETs.

However, vertical FETs are challenged by the separate nature of the devices. The devices or even groups of devices are separated from each other across isolation boundaries, well boundaries and region boundaries. Small narrow active area (RX) regions can result in higher resistance to power supplies due to normal critical dimension (CD) and overlay variation (e.g., between lithographic masks, etc.). As a result, power supply connections and device structures that need to adapt to these conditions consume precious real estate on the substrate.

Therefore, a need exists for circuit layouts for VFETs that reduce the burden on power supplies and preserve layout area.

SUMMARY

In accordance with an embodiment of the present invention, a method for device layout with vertical transistors includes identifying active area regions in a layout of a semiconductor device with vertical transistors. Sets of adjacent active area regions having a same electrical potential are determined. The sets of adjacent active area regions to be merged are prioritized based upon one or more performance criterion. The sets of adjacent active area regions are merged to form larger active area regions according to a priority. Circuit layouts for vertical field effect transistors (VFETs) in accordance with the present embodiments reduce the burden on power supplies and preserve layout area by merging regions to form larger active area regions.

A non-transitory computer readable storage medium is included having a computer readable program for device layout with vertical transistors, wherein the computer readable program when executed on a computer causes the computer to perform the steps of identifying active area regions in a layout of a semiconductor device with vertical transistors; determining sets of adjacent active area regions having a same electrical potential; prioritizing the sets of adjacent active area regions to be merged based upon one or more performance criterion; and merging the sets of adjacent active area regions to form larger active area regions according to a priority. Circuit layouts for VFETs in accordance with the present embodiments reduce the burden on power supplies and preserve layout area by merging regions to form larger active area regions.

A semiconductor device includes a substrate and an active area region forming a bottom source/drain region on the substrate. A plurality of vertical transistors are formed on the bottom source/drain region, where the bottom source/drain region is shared between the plurality of vertical transistors. The vertical transistors include a vertical channel, a gate dielectric layer formed about the vertical channel, a gate conductor formed about the gate dielectric and a top source/drain region formed on the vertical channel. Devices with VFETs in accordance with the present embodiments reduce the burden on power supplies and preserve layout area by merging regions to form larger active area regions.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments or the present invention include devices, layouts and methods for fabricating semiconductor devices. Particularly useful embodiments combine adjacent active regions (RX) into merged regions so that power and ground supplies consume less power. This improves performance of the semiconductor device by, e.g., simplifying layouts, reducing power demands, reducing resistance, among others. These benefits apply during nominal conditions and worst case (high load) conditions. By further tuning a layout to eliminate fill features or other components between active regions, a resistance of bottom source and drain (S/D) regions can be further reduced.

Active area regions (RX) include active semiconductor regions separated by dielectric isolation regions on a substrate (e.g., active silicon semiconductor or conductor regions, which are isolated by shallow trench isolation (STI) regions). One aspect of the present principles determined which of these regions can be merged in accordance with a priority. The priority can be determined based upon performance criteria or other criteria, such as layout constraints or other constraints.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a." "an" and "the" are intended to include the plural forms as well, unless the context clearly indicates otherwise. It will be further understood that the terms "comprises." "comprising." "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath." "below." "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second. etc. can be used herein to describe various elements, these elements should not be limited by these terms. These terms are only used to distinguish one element from another element. Thus, a first element discussed below could be termed a second element without departing from the scope of the present concept.

Figure 1:
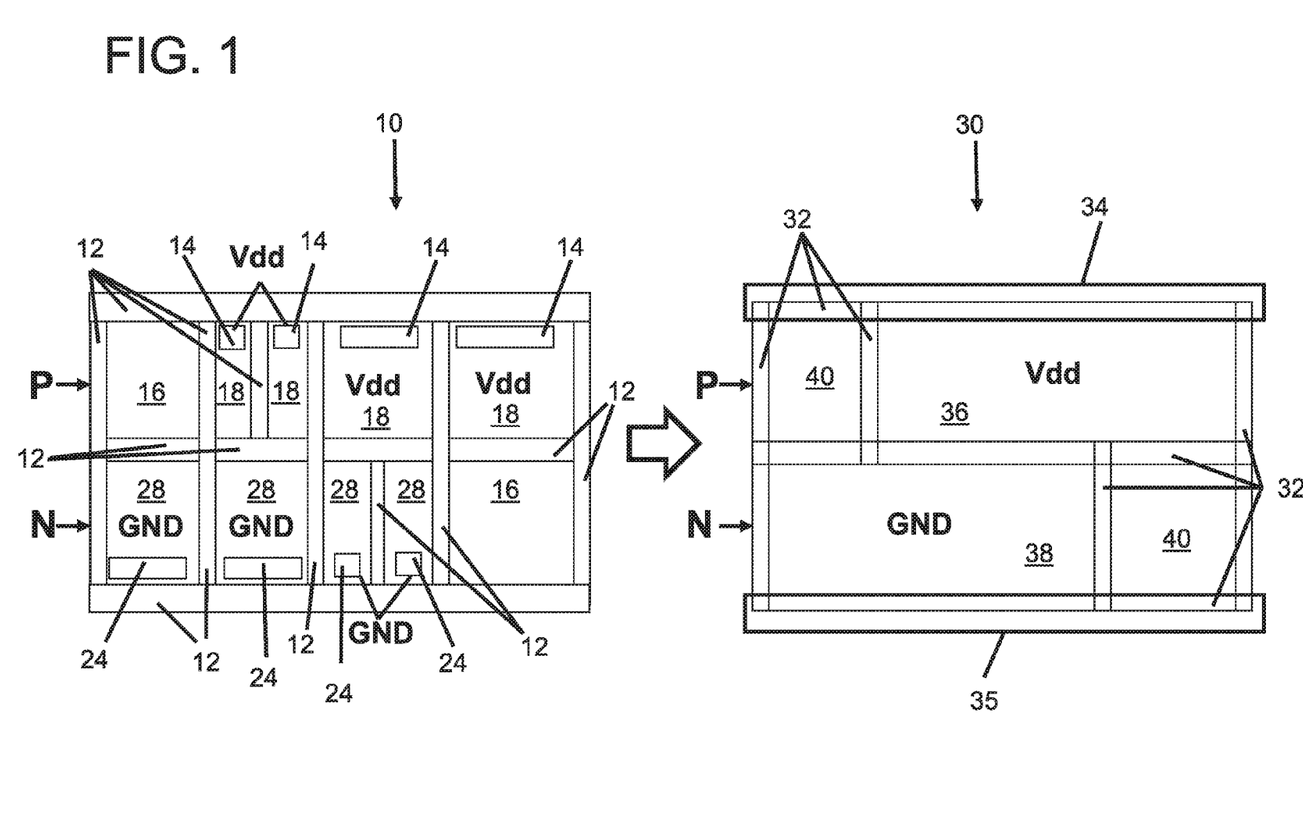
FIG. 1 is a layout view showing a layout having active area regions merged, trench isolation regions merged and continuous supply and ground rails formed to provide an optimized layout with reduced resistance in accordance with an embodiment of the present invention.

Referring now to the drawings in which like numerals represent the same or similar elements and initially to FIG. 1, illustrative layouts 10 and 30 are depicted to show optimization of active area regions (or active regions) in accordance with aspects of the present invention. The layout 10 includes a plurality of active regions 18 receiving a supply voltage. Vdd. The active regions 18 include power supply contacts 14 employed to provide the supply voltage to vertical transistors disposed within each active region 18. The layout 10 further includes a plurality of active regions 28 receiving a ground voltage GND. The active regions 28 include grounds contacts 24 employed to provide the supply voltage to vertical transistors disposed within each active region 28.

The vertical transistors (not shown) often have a bottom source or drain region tied to the potential Vdd or GND depending on their location in the layout. In one embodiment, the active regions 18 are formed for PFETs on a N-well (marked with a "P" in FIG. 1), while the active regions 28 are formed for NFETs on an P-well (marked with an "N" in FIG. 1). The active regions 18 and 28 are defined by trench isolation regions 12. The trench isolation regions 12 provide electrical isolation between active regions 18 and 28 and between the active regions 18, 28 and external devices or components. The active regions 18, 28 can each include a single VFET source or drain region share by a plurality of VFETs.

In layout 10, the active regions 18, 28 are separated and need one or more contacts 14 or 24 for each active region 18, 28. This renders power and ground supplies less effective due to higher electrical resistance. Further, the layout 10 consumes a larger layout area, having a multitude of isolation trench regions 12 throughout the layout 10. Other regions 16 can also be included in the layout 10. These regions 16 can include other components or structures including fill materials, conductive materials, other components or structures, etc. These regions 16 are not at the Vdd or GND potential.

In accordance with one embodiment, adjacent active regions 18 or 28 of layout 10 are merged so that power and ground supplies have a much lower resistance as depicted in layout 30. The layout 10 is reconfigured to merge bottom source or drain regions (S/Ds) in active regions 18 in a combined region 38 shared by a plurality of VFETs tied to a same potential (GND). Likewise, layout 10 is reconfigured to merge bottom source or drain regions (S/Ds) in active regions 28 in a combined region 36 shared by a plurality of VFETs tied to a same potential (Vdd).

A common bus 34 forms a contact to an entire active region 36 for the Vdd power supply. Similarly, a common bus 35 forms a contact to an entire active region 38 for the GND power supply. In some embodiments, the bottom region (e.g., active regions 36, 38) includes a source and is tied to Vdd or GND. In other embodiments, the bottom region (e.g., active regions 36, 38) includes a drain and is tied to Vdd or GND. When adjacent VFETs have sources (or drains) tied to a same Vdd or GND potential (or any other common potential) then trench isolation can be eliminated between the VFETs. This provides a reduced footprint for trench isolations 32 between the VFETs. The VFETs can employ a large shared bottom source/drain region 36, 38.

Some of the benefits provided by merged active regions include continuous active regions, which lower resistance of trench silicide (TS) contacts to bottom S/D regions and provide lower lateral active region resistance (due at least to, e.g., less components and interfaces between them). Increased device drive current and improved thermal resistance are also achieved with merged S/D regions. Less processing and shared active regions also leads to reduced variability between devices and performance of these devices. Using a common active region (source or drain) assists in reducing or eliminating capacitance issues between merged devices. The device layout is simplified with the use of continuous power or ground contact rails, which also lower resistance as well. This also results in an improved use of wiring tracks for the VFETs, and potential improvements for spacer and gate definition as maintaining spacings between VFETs is less of an issue using merged active regions that are much larger and provide improved resistance characteristics and lower capacitance.

Figure 2:
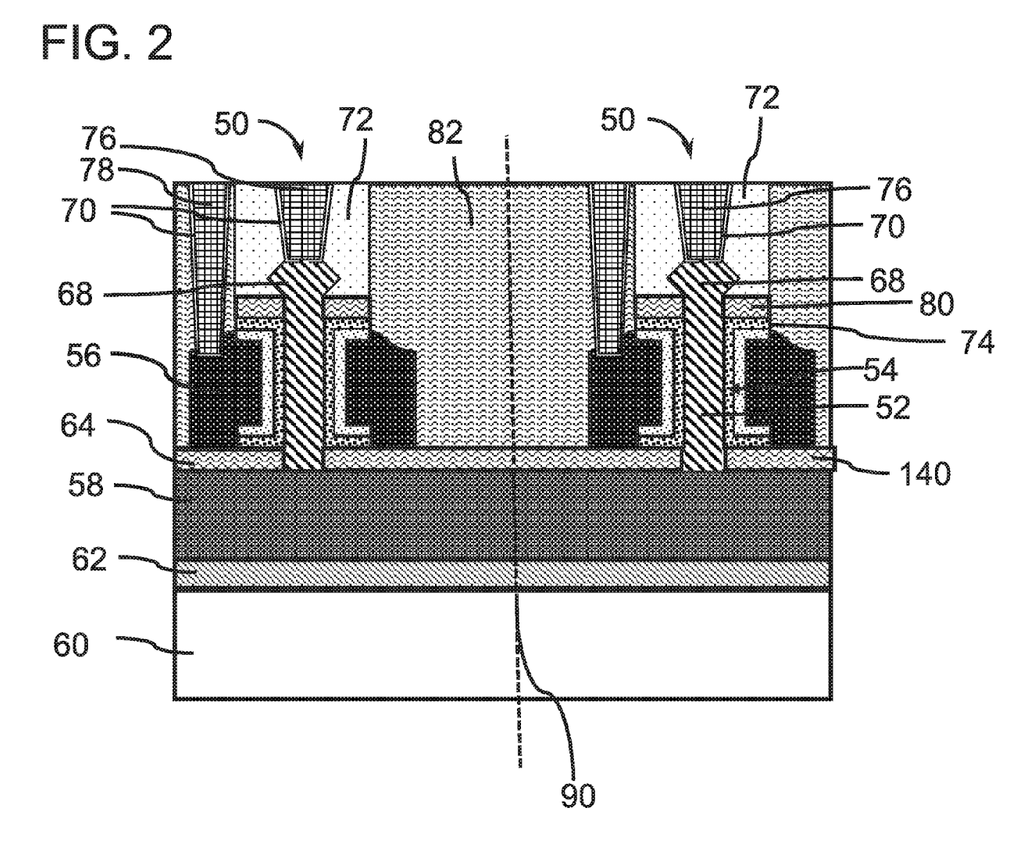
FIG. 2 is a cross-sectional view showing vertical transistors sharing a common active area region including a bottom source/drain region in accordance with an embodiment of the present invention.

Referring to FIG. 2, a cross-sectional view of vertical field effect transistors 50 having a vertical fin 52 (channel) and a gate structure 54 with a gate electrode 56 are shown on a merged S/D region 58 in accordance with an exemplary embodiment.

In one or more embodiments, a counter-doped layer 62 can be formed on or within a substrate 60, where the counter-doped layer 62 can be used to electrically isolate the merged source/drain region 58 from the bulk of the substrate 60. The substrate 60 can include any suitable substrate materials, such as, e.g., Si, SiGe, SiC, silicon-on-insulator, III-V materials, etc.

A gate dielectric layer 74 can include one or more dielectric layers and can be formed on the vertical fin 54 and a bottom spacer layer 64 (dielectric layer. e.g., SiN). At least one layer of the gate dielectric layer 74 may be a high-k material, including but not limited to metal oxides such as hafnium oxide (e.g., $HfO_2$), hafnium silicon oxide (e.g., $HfSiO_4$), etc. The gate electrode or gate conductor 56 includes a metal or other highly conductive material and surrounds (full or partially) the vertical fin 52 or channel. The gate electrode 56 is contacted by a gate contact 78. A top source/drain region 68 is contacted by a contact 76. The contact 76 can also be referred to as a trench silicide (TS) contact as a silicide can be formed at the interface of the top source/drain region 68 and the contact 76. The top source/drain region 68 is encased in a dielectric layer 72 (e.g., an oxide). A barrier layer or liner 70 (e.g., TiN, TaN, etc.) may be formed in the openings for contacts 76 and 78 as well. The vertical transistors 50 are encased in an interlevel dielectric material 82, for example, silicon oxide (e.g., $SiO_2$).

It should be understood that the devices 50 depicted in FIG. 2 are illustrative. Other vertical FET designs and configurations may be employed. In addition, vertical nanowires or other vertically devices may also be employed.

FIG. 2 illustratively shows two VFETs 50 sharing a merged bottom S/D region 58. In conventional structures, shallow trench isolation regions or other barriers may be present through the bottom S/D region 58 and into the substrate 60. These barriers would be located between the devices 50 (e.g., along the boundary line 90). The present embodiments remove the need for such a barrier and merge the bottom S/D regions 58 between VFETs 50.

Any number of other VFETs can also share the merged S/D region 58. Devices 50 that can share a merged S/D region 58 can be identified when the devices 50 have a same fixed potential or have a fixed or transient potential next to a fill region (region filled with a dielectric material). Advantageously, the merge region is associated with a common potential and is tolerant of different dopant conductivities and concentrations. Therefore, the active regions 58 can be merged across cell boundaries (e.g., N-N or P-P cell boundaries). In addition, merging can be performed between multiple FETs for a single or multiple components. e.g., devices in a same cell, devices in adjacent cells (N-N or P-P), adjacent devices sharing bottom S/D regions connected to a same bus (GND or Vdd), adjacent devices having bottom S/D regions extended into or through fill regions, etc.

In one embodiment, combinatorial logic elements and sequential logic elements can be merged. For example, an inverter active region can be merged with an active region of a different adjacent inverter; a NAND gate active region can be merged with an active region of another NAND gate or inverter; a NOR gate active region can be merged with another NOR gate or inverter active region, etc. In another example, a fill area can be merged with an active area of an inverter. NAND gate, NOR gate, etc. A fill area N region can be merged with an adjacent device, and a P region can be merged with a corresponding device in the opposite direction.

The present embodiments are applicable to any device where channel current is in the vertical direction. This can include vertical transport finFETs, vertical gate complementary metal oxide semiconductor (CMOS) FETs, vertical nanowire devices, etc.

Figure 3:
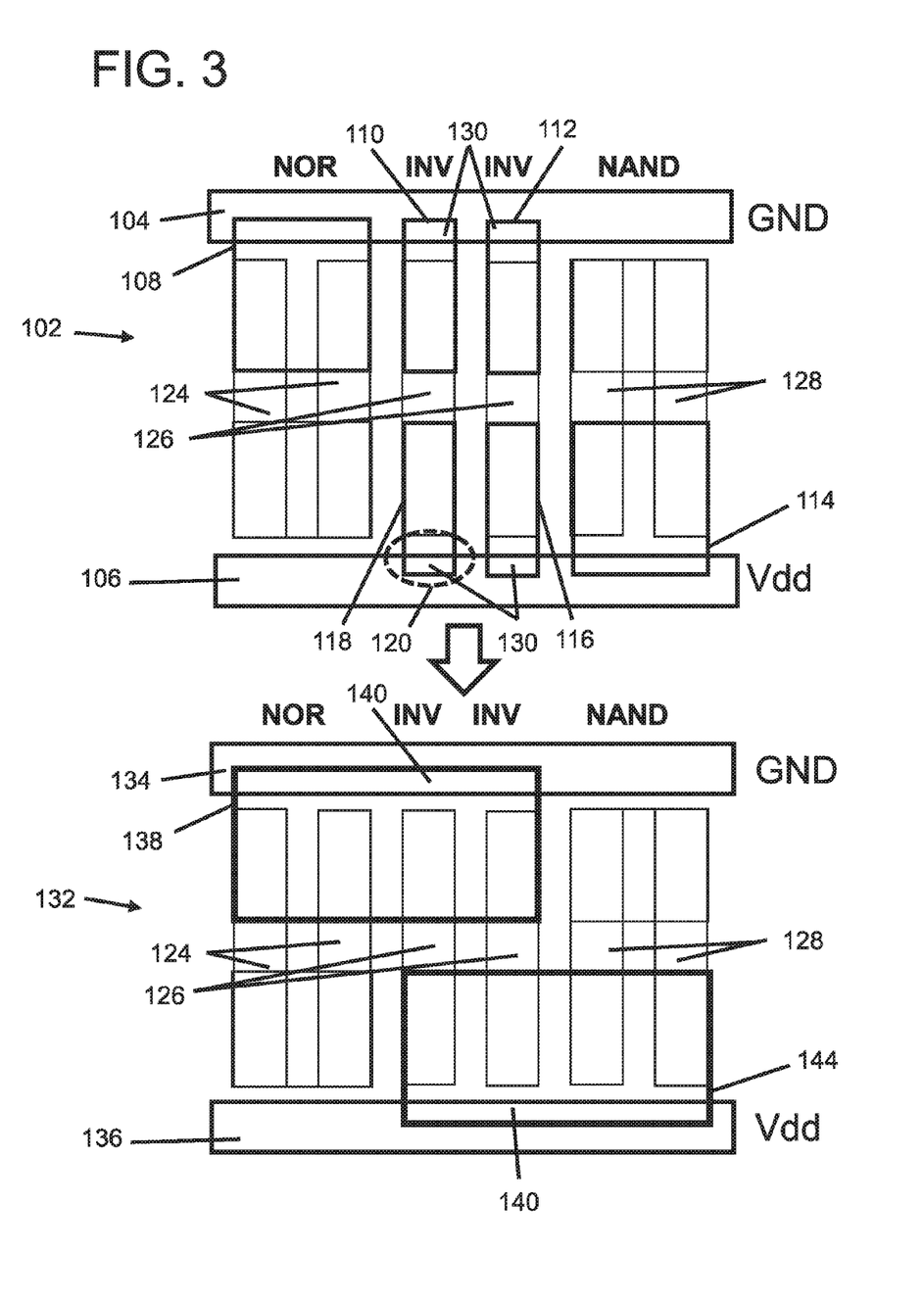
FIG. 3 is a layout view showing a layout having active area regions merged and shared between two or more logic devices in accordance with an embodiment of the present invention.

Referring to FIG. 3, another example is depicted showing a layout 102 having many isolated active regions 108, 110, 112 and active regions 114, 116, 118. The active region 108 includes components 124 to form a NOR gate. The active regions 110 and 112 include components 126 to form inverters (INV). The active region 114 includes components 128 to form a NAND gate. The active regions 116 and 118 include components 126 to form the inverters. The isolated active regions 108, 110, 112 and active regions 114, 116, 118 are susceptible to higher resistance (both nominal and variable) as a result of the fractured and separated active region arrangement.

In addition, due to the limited device widths, contacts formed overlapping a supply rail 106 or ground rail 104 are small and highly dependent on overlay tolerances. For example, in region 120, overlap of the active region 118 and the rail 106 indicates an intersection region where a contact (e.g., a TS contact) could be inadequate or subject to shorting due to the lack of intersection area.

In accordance with one aspect of the present invention, active regions are merged in layout 132 for VFETs of combinational and sequential logic devices, such as e.g., NOR gates, inverters and NAND gates, etc. of layout 102. The isolated active regions 108, 110, 112 are merged to form a larger active region 138 in layout 132. The active region 138 serves the NOR gate and two inverters. The isolated active regions 114, 116, 118 are merged to form a larger active region 144 in layout 132. The active region 144 serves the NAND gate and the two inverters.

Contacts 140 can now be formed continuously along each active region 138, 140 to further enhance the contact size and reduce narrow intersection areas (120). A supply rail 136 or ground rail 134 have a larger overlap with the active region 144 and active region 138, respectively. In this way, contacts (e.g., TS contacts) can be much larger.

The larger active regions 138, 144 and larger contact intersection areas for TS contacts provide lower resistance including lower TS contact to active region resistance, lower lateral resistance across active areas, and lower thermal resistance (better heat flow).

Figure 4:
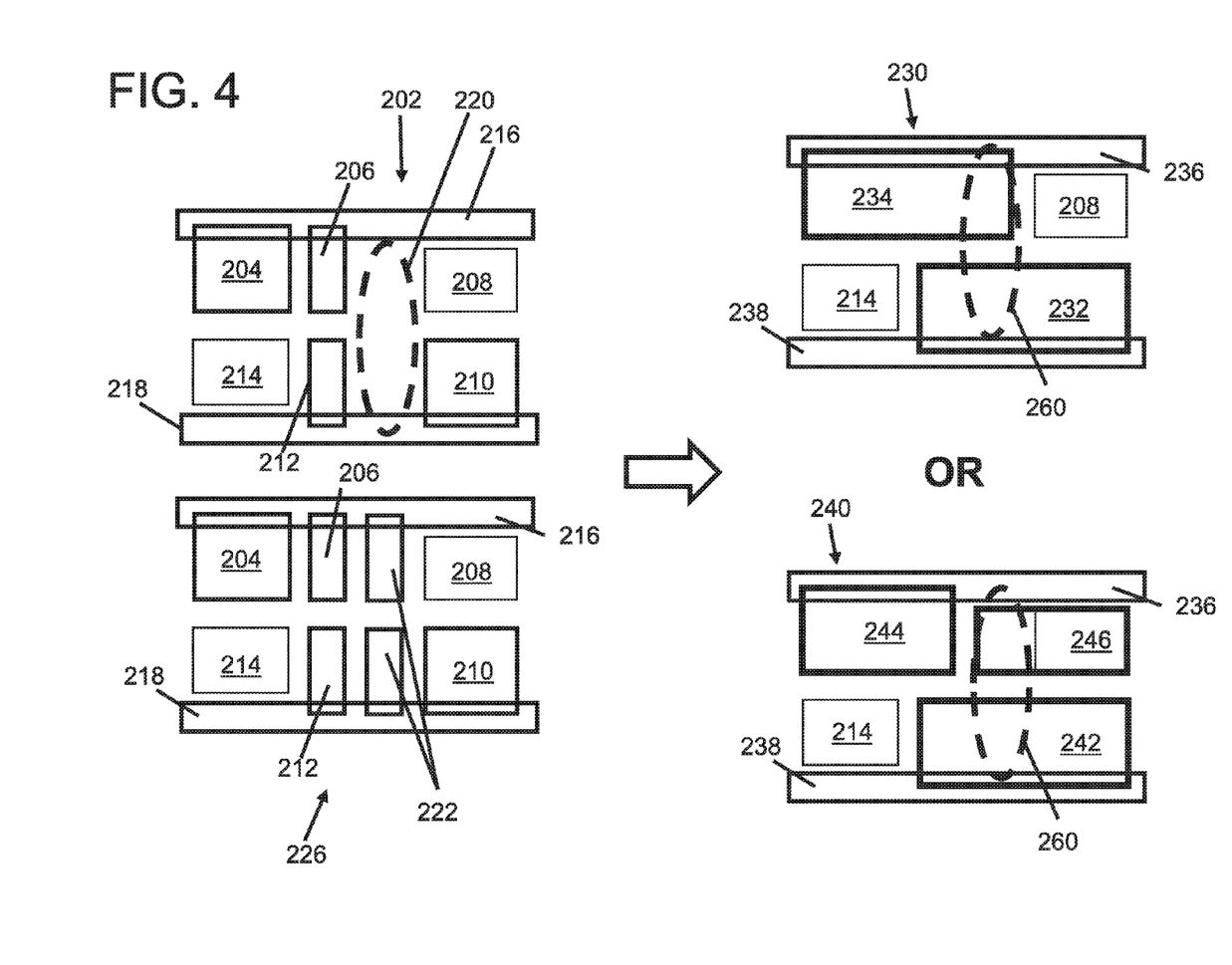
FIG. 4 is a layout view showing a layout having active area regions merged with no fill and dummy fill regions for active area regions connected to supply/ground rails and isolated from supply/ground rails in accordance with an embodiment of the present invention.

Referring to FIG. 4, layouts 202 and 226 can be improved to either layout 230 or layout 240. Layouts 202 and 206 include no fill regions 220 and dummy fill regions 222, respectively. The no fill regions 220 and dummy fill regions 222 can be merged with active area regions to provide the layouts 230 or 240.

In one example, layouts 202 and 226 each include active regions 204 and 206 and active area regions 212 and 210. In addition, other components 208 and 214 are also provided, which may include other active area regions, other structures or other components.

The layout 202 can have active area regions 204, 206 and no fill region 220 merged to form active area region 234 in layout 230. Active area regions 212, 210 and no fill region 220 are merged to form active area region 232. Components 208 and 214 remain intact. Layout 230 includes regions 232 and 234 with a greater overlap of conductive rails 236 and 238 than the overlap of rails 216 and 218 in layouts 202 and 226. The merged components in layout 230 are connected along the rails 236 and 238. The no fill region 220 is eliminated and now is included in region 260 of the active regions 234 and 232, which provide a larger active area and further reduced resistance.

The layout 226 can have active area regions 204, 206 and dummy fill region 222 merged to form active area region 234 in layout 230. Active area regions 212, 210 and dummy fill region 222 are merged to form active area region 232. Components 208 and 214 remain intact. Layout 230 includes regions 232 and 234 with a greater overlap of conductive rails 236 and 238 than the overlap of rails 216 and 218 in layouts 202 and 226. The merged components in layout 230 are connected along the rails 236 and 238. The dummy fill region 222 is eliminated and now is included in region 260 of the active regions 234 and 232, which provide a larger active area and further reduced resistance.

In layout 230, in one example, a fill area 222 and N region 204, 206 can be merged and a fill area 222 and P region 210, 212 can be merged where devices are formed across the fill area with different dopant conductivities.

In layout 240, the layout 202 can have active area regions 204, 206 merged to form active area region 244. Active area regions 212, 210 and no fill region 220 can be merged to form active area region 242. Component 208 and no fill region 220 can be merged into a new active area region 246 that is isolated from rail 236. Component 214 remains intact. Layout 240 includes regions 242 and 244 that have a greater overlap of conductive rails 238 and 236, respectively, than the overlap of rails 218 and 216 in layouts 202 and 226. The no fill region 220 is now included in region 260 of active area regions 246 and 242, which provides a greater active area and further reduces resistance.

In layout 240, the layout 226 can have active area regions 204, 206 merged to form active area region 244. Active area regions 212, 210 and dummy fill region 222 can be merged to form active area region 242. Component 208 and dummy fill region 222 can be merged into the new active area region 246 that is isolated from rail 236. Component 214 remains intact. Layout 240 includes regions 242 and 244 that have a greater overlap of conductive rails 238 and 236, respectively, than the overlap of rails 218 and 216 in layouts 202 and 226. The dummy fill region 222 is now included in region 260 of active area regions 246 and 242, which provides a greater active area and further reduces resistance.

Figure 5:
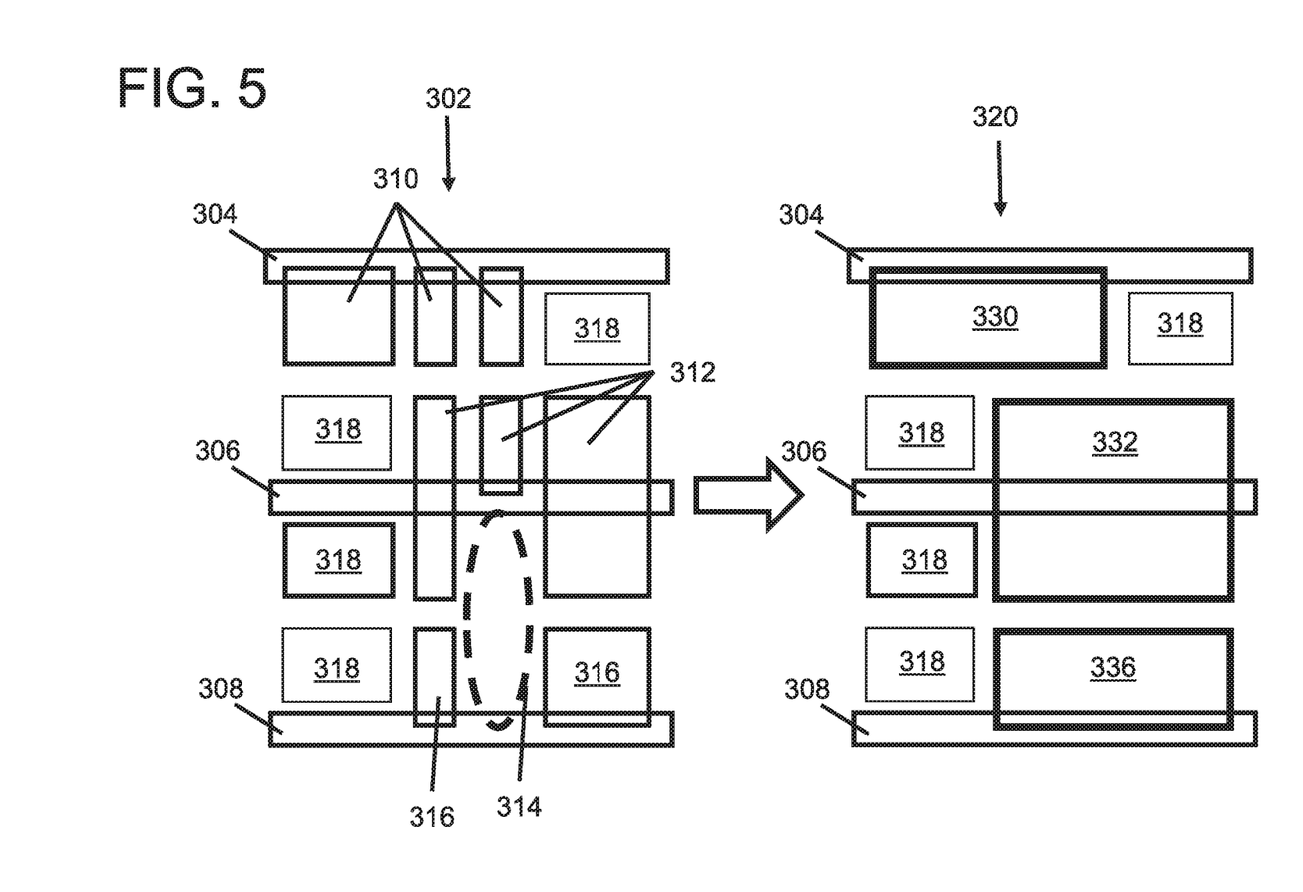
FIG. 5 is a layout view showing a layout having active area regions merged including an active region extending over cell boundaries in accordance with an embodiment of the present invention.

Referring to FIG. 5, a layout 302 is converted to a layout 320 by merging active area regions including regions across an N-N or P-P cell boundary 306. For example, logic circuits can placed in a row on a chip and additional rows are placed above and below each circuit row with the N region or P region abutting across the cell boundary. Layout 306 includes rails 304, 306 and 308 where rail 306 also represents a dopant boundary between P-P cells or N-N cells. Layout 306 includes active regions 310, 312 and 316. In addition a no fill region 314 is disposed between other regions in the layout 302. Components 318 can include active area regions or other components or devices.

In layout 320, regions 310 are merged into active area region 330; regions 312 and part of the no fill region 314 are merged into active area region 332 and regions 316 and part of the no fill region 314 are merged into active area region 336.

The active area region 332 is merged across cell boundaries between regions of different dopant concentration or even different dopant conductivities. In one embodiment, all portions of the active area region 332 may be maintained at a same potential to permit merging of different cell regions.

It should be understood that with the active area regions depicted in the FIGs., the active area regions include or will include two or more VFETs, or other transistor structures formed thereon. These devices will share a common S/D region (e.g., bottom S/D region). These VFETs are formed with merged active area regions that can include one or more of: adjacent devices that share bottom S/D regions and connect to a power bus, devices in a same cell, devices in adjacent cells (N-N or P-P devices), adjacent devices with bottom S/D regions connected to a ground bus, adjacent devices with bottom S/D regions extended into fill (or no fill) regions, adjacent devices with bottom S/D regions merged through a fill (or no fill) region, etc. These VFETs with merged active area regions can include, e.g., an inverter merged with another inverter, a NAND gate merged with another NAND gate or an inverter, a NOR gate merged with another NOR gate or inverter or any combination of combinational logic circuits and/or sequential logic circuits. Fill area active area regions can be merged with inverters, NAND gates, NOR gates or other gate structures or transistor groupings. In one example, a fill area N region can be merged with a device adjacent to the fill area and a device in a P region merged with a device in the opposite direction.

Figure 6:
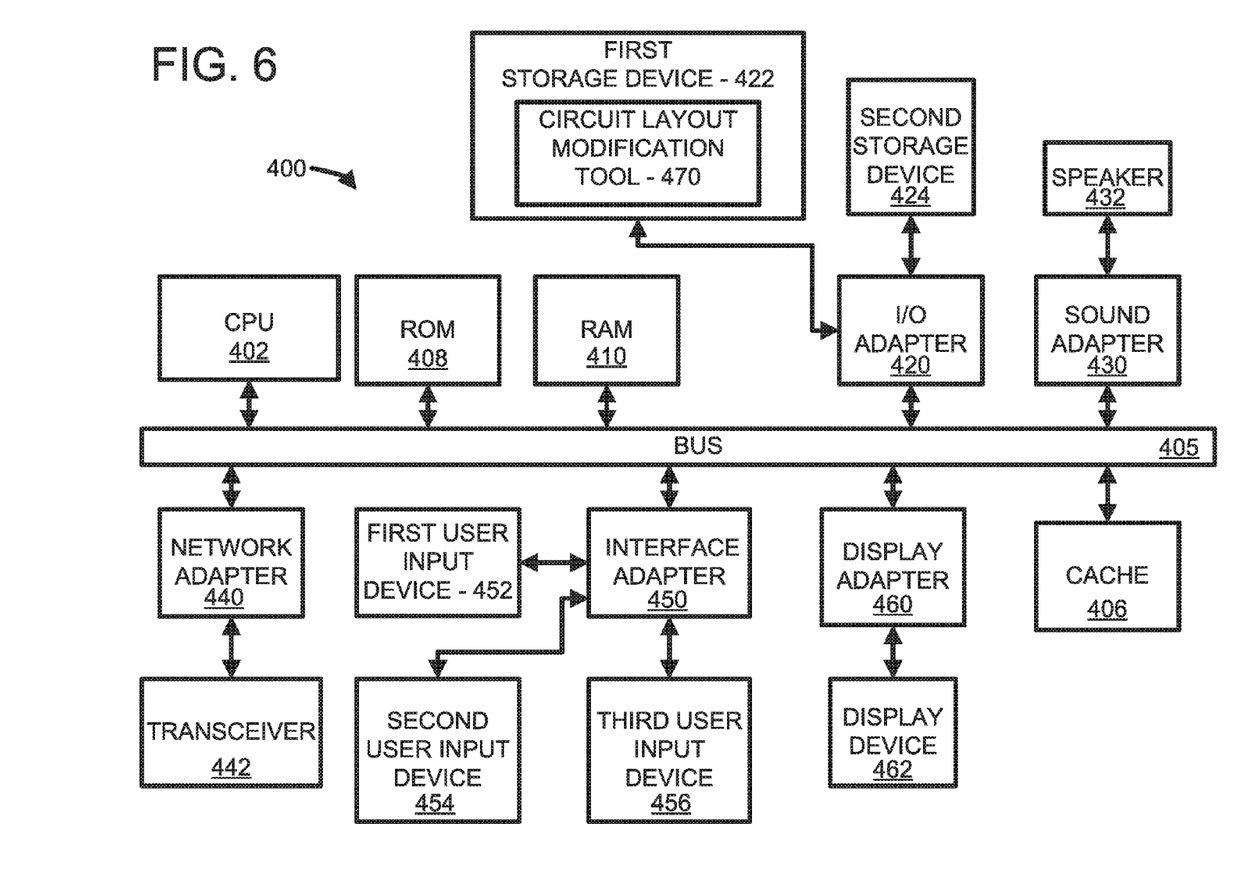
FIG. 6 is a block/flow diagram showing a system for modifying or creating an optimized layout in accordance with an embodiment of the present invention.

Referring to FIG. 6, an exemplary processing system 400 to which the present invention may be applied is shown in accordance with one embodiment. The processing system 400 includes at least one processor (CPU) 402 operatively coupled to other components via a system bus 405. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 405.

A first storage device 422 and a second storage device 424 are operatively coupled to system bus 405 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 405 by the sound adapter 130. A transceiver 442 is operatively coupled to system bus 405 by network adapter 440. A display device 462 is operatively coupled to system bus 405 by display adapter 460.

A first user input device 452, a second user input device 454, and a third user input device 456 are operatively coupled to system bus 405 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The storage devices 422 and 424 can include a circuit layout modification tool 470. A design layout may be input to the system 400, and the tool 470 evaluates the design to determine active area regions, trench isolation regions and fill/no fill regions that can be merged to reduce resistance and reduce layout area for semiconductor devices with vertical transistor devices. The tool 470 employs the methods as set forth in FIG. 7 and described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
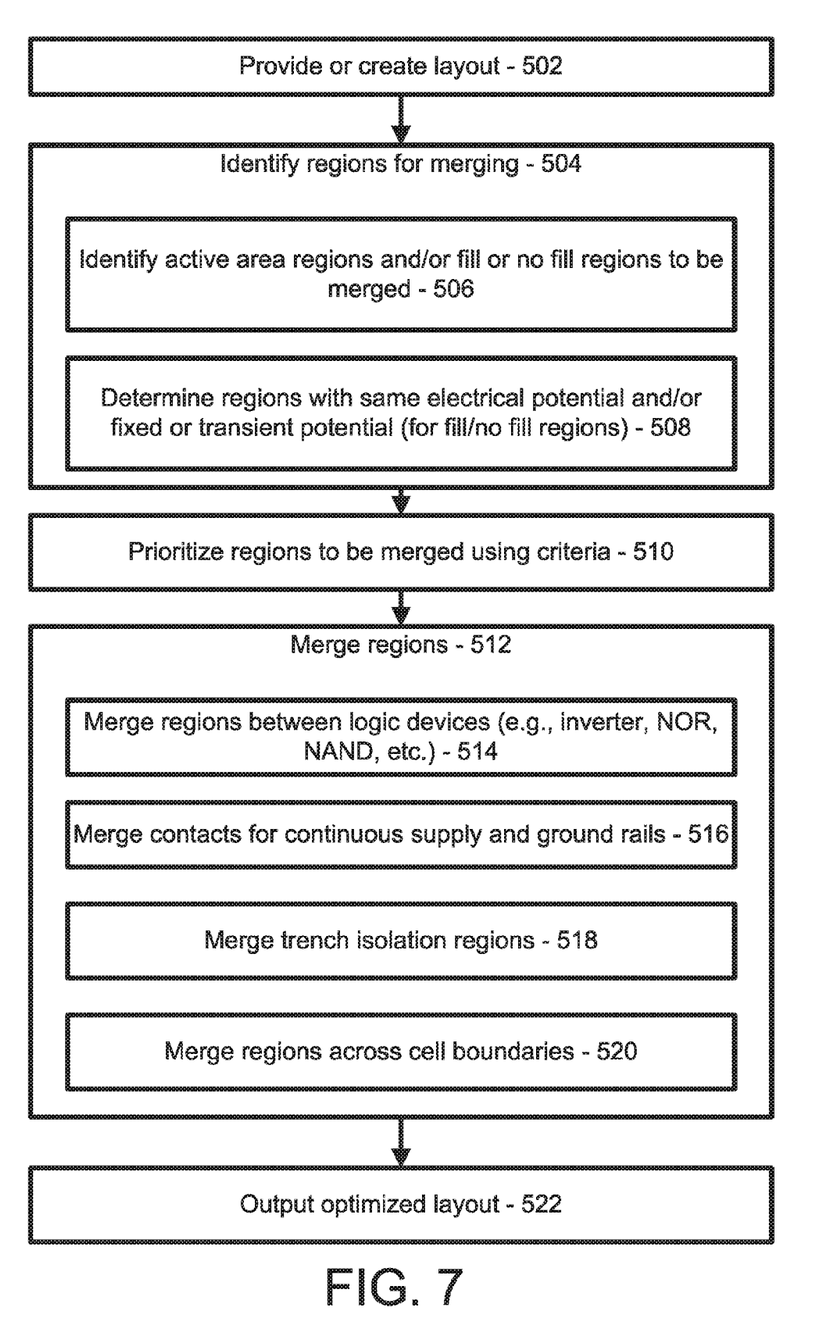
FIG. 7 is a block/flow diagram showing a system/method for device layout with vertical transistors in accordance with embodiments of the present invention.

Referring to FIG. 7, methods for device layout with vertical transistors are illustratively shown. In block 502, a device layout can be provided (e.g., an existing or candidate design), created or improved upon by employing a merging tool (470, FIG. 6). The merging tool 470 may be a part of a suite of design tools or may include a separate tool or program run using input from the layout or design. The layout or design is input to the tool or program to be optimized. The tool or tool suite may be provided over a network or distributed computer system.

In block 504, regions are identified for merging. In block 506, active area regions are identified for merging in a layout of a semiconductor device with vertical transistors. Fill (dummy fill) or no fill regions adjacent to active area regions may also be identified in the layout for merging with the active regions.

In block 508, sets of adjacent active area regions having a same electrical potential are determined. This can include determining the sets of adjacent active area regions having a same fixed potential and/or a fixed or transient potential next to a fill or no fill region. Other merging criteria are also contemplated.

In block 510, the sets of adjacent active area regions to be merged are prioritized based upon one or more performance criterion. The one or more performance criterion is selected from the group consisting of resistance, capacitance, variability reduction, thermal resistance, circuit performance and reduction of worst case variability (e.g., evaluating based on worst case scenarios of performance or layout conflicts). Priorities may be set by setting rules to determine when and how merging should be performed.

In block 512, the sets of adjacent active area regions are merged to form larger active area regions according to a priority. The sets of adjacent active area regions can have their shapes modified to merge them in accordance with the prioritized merging of the active area regions.

In block 514, the sets of adjacent active area regions can be merged between logic devices, e.g., between one or more of inverters, NAND gates. NOR gates, etc.

In block 516, merging includes connecting the larger active area regions to one or more continuous buses where the continuous buses replace a plurality of separate supply or ground contacts. In block 518, merging includes reducing trench isolation regions between the sets of adjacent active area regions. In block 520, merging includes merging the sets of adjacent active area regions across cell boundaries, if needed. This includes across boundaries having different dopant conductivities.

In block 522, a new layout is output having merged active area regions, reduced shallow trench isolations, common supply and ground rails, etc. The new layout includes reduced resistance and lower load for power supplies, lower resistance across source and drain regions, lower capacitance between VFETs that share an active area, better utilization of no fill or dummy fill regions, among other benefits.

Having described preferred embodiments for vertical transistors with merged active area regions (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for device layout with vertical transistors, comprising:
   identifying active area regions in a layout of a semiconductor device with vertical transistors;
   determining sets of adjacent active area regions having a same electrical potential;
   prioritizing the sets of adjacent active area regions to be merged based upon one or more performance criterion, wherein the one or more performance criterion is selected from the group consisting of resistance, capacitance, variability reduction, thermal resistance, circuit performance and reduction of worst case variability; and
   merging the sets of adjacent active area regions to form larger active area regions according to a priority set by setting rules to determine when and how merging is performed.

2. The method as recited in claim 1, further comprising:
   identifying fill or no fill regions adjacent to active area regions in the layout;
   merging the fill or no fill regions with the sets of adjacent active area regions to form larger active area regions.

3. The method as recited in claim 2, wherein determining the sets of adjacent active area regions having the same electrical potential includes determining the sets of adjacent active area regions having a fixed or transient potential next to a fill or no fill region.

4. The method as recited in claim 1, wherein determining the sets of adjacent active area regions having the same electrical potential includes determining the sets of adjacent active area regions having a same fixed potential.

5. The method as recited in claim 1, wherein merging the sets of adjacent active area regions includes modifying shapes of the active area regions to merge prioritized active area regions.

6. The method as recited in claim 1, wherein merging the sets of adjacent active area regions includes merging active area regions between logic devices.

7. The method as recited in claim 6, wherein the logic devices are selected from the group consisting of combinatorial logic elements and sequential logic elements.

8. The method as recited in claim 1, further comprising connecting the larger active area regions to one or more continuous buses where the continuous buses replace a plurality of separate supply or ground contacts.

9. The method as recited in claim 1, wherein merging the sets of adjacent active area regions further comprises reducing trench isolation regions between the sets of adjacent active area regions.

10. The method as recited in claim 1, wherein merging the sets of adjacent active area regions includes merging the sets of adjacent active area regions across cell boundaries.

11. A non-transitory computer readable storage medium comprising a computer readable program for device layout with vertical transistors, wherein the computer readable program when executed on a computer causes the computer to perform the steps of:
    identifying active area regions in a layout of a semiconductor device with vertical transistors;
    determining sets of adjacent active area regions having a same electrical potential;
    prioritizing the sets of adjacent active area regions to be merged based upon one or more performance criterion, wherein the one or more performance criterion is selected from the group consisting of resistance, capacitance, variability reduction, thermal resistance, circuit performance and reduction of worst case variability; and
    merging the sets of adjacent active area regions to form larger active area regions according to a priority set by setting rules to determine when and how merging is performed.

12. The computer readable storage medium as recited in claim 11, further comprising:
    identifying fill or no fill regions adjacent to active area regions in the layout;
    merging the fill or no fill regions with the sets of adjacent active area regions to form larger active area regions.

13. The computer readable storage medium as recited in claim 12, wherein determining the sets of adjacent active area regions having the same electrical potential includes determining the sets of adjacent active area regions having a fixed or transient potential next to a fill or no fill region.

14. The computer readable storage medium as recited in claim 11, wherein determining the sets of adjacent active area regions having the same electrical potential includes determining the sets of adjacent active area regions having a same fixed potential.

15. The computer readable storage medium as recited in claim 11, wherein merging the sets of adjacent active area regions includes merging active area regions between logic devices selected from the group consisting of combinatorial logic elements and sequential logic elements.

16. The computer readable storage medium as recited in claim 11, further comprising:
    connecting the larger active area regions to one or more continuous buses where the continuous busses replace a plurality of separate supply or ground contacts; and
    reducing trench isolation regions between the sets of adjacent active area regions.

17. The computer readable storage medium as recited in claim 11, wherein merging the sets of adjacent active area regions includes merging the sets of adjacent active area regions across cell boundaries.

18. A method for device layout with vertical transistors, comprising:
    identifying active area regions in a layout of a semiconductor device with vertical transistors;
    determining sets of adjacent active area regions having a same electrical potential;
    prioritizing the sets of adjacent active area regions to be merged based upon one or more performance criterion;

merging the sets of adjacent active area regions to form larger active area regions according to a priority set by setting rules to determine when and how merging is performed; and connecting the larger active area regions to one or more continuous buses where the continuous buses replace a plurality of separate supply or ground contacts.

19. The method as recited in claim 18, further comprising:

identifying fill or no fill regions adjacent to active area regions in the layout;

merging the fill or no fill regions with the sets of adjacent active area regions to form larger active area regions, wherein determining the sets of adjacent active area regions having the same electrical potential includes determining the sets of adjacent active area regions having a fixed or transient potential next to a fill or no fill region.

20. The method as recited in claim 18, wherein determining the sets of adjacent active area regions having the same electrical potential includes determining the sets of adjacent active area regions having a same fixed potential.

21. The method as recited in claim 18, wherein the one or more performance criterion is selected from the group consisting of resistance, capacitance, variability reduction, thermal resistance, circuit performance and reduction of worst case variability.

22. The method as recited in claim 18, wherein merging the sets of adjacent active area regions includes modifying shapes of the active area regions to merge prioritized active area regions.

23. The method as recited in claim 18, wherein merging the sets of adjacent active area regions includes merging active area regions between logic devices, wherein the logic devices are selected from the group consisting of combinatorial logic elements and sequential logic elements.

* * * * *